(12) United States Patent
Krumanaker et al.

(10) Patent No.: US 10,443,398 B2
(45) Date of Patent: Oct. 15, 2019

(54) TURBINE BLADE

(71) Applicant: General Electric Company, Schenectady, NY (US)

(72) Inventors: Matthew Lee Krumanaker, Blue Ash, OH (US); Weston Nolan Dooley, West Chester, OH (US); Steven Robert Brassfield, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 204 days.

(21) Appl. No.: 14/884,100

(22) Filed: Oct. 15, 2015

(65) Prior Publication Data

US 2017/0107828 A1    Apr. 20, 2017

(51) Int. Cl.
| | |
|---|---|
| F01D 5/18 | (2006.01) |
| F01D 5/14 | (2006.01) |
| F01D 5/20 | (2006.01) |

(52) U.S. Cl.
CPC ............ *F01D 5/187* (2013.01); *F01D 5/147* (2013.01); *F01D 5/20* (2013.01); *F05D 2220/32* (2013.01); *F05D 2240/303* (2013.01); *F05D 2240/307* (2013.01); *F05D 2260/20* (2013.01); *F05D 2260/221* (2013.01); *F05D 2260/22141* (2013.01); *Y02T 50/676* (2013.01)

(58) Field of Classification Search
CPC . F01D 5/147; F01D 5/18; F01D 5/186; F01D 5/187; F01D 5/188; F01D 5/189; F01D 25/12; F05D 2260/20; F05D 2260/203; F05D 2260/204; F05D 2260/2212; F05D 2260/22141; F05D 2260/941
See application file for complete search history.

(56) References Cited

U.S. PATENT DOCUMENTS

| | | | |
|---|---|---|---|
| 3,527,543 | A | 9/1970 | Howald |
| 3,864,058 | A | 2/1975 | Womack |
| 4,416,585 | A | 11/1983 | Abdel-Messeh |
| 4,669,957 | A | 6/1987 | Phillips et al. |
| 5,156,526 | A | 10/1992 | Lee et al. |
| 5,165,852 | A | 11/1992 | Lee et al. |

(Continued)

FOREIGN PATENT DOCUMENTS

| | | |
|---|---|---|
| EP | 1630354 A2 | 3/2006 |
| EP | 2835501 A1 | 2/2015 |

(Continued)

OTHER PUBLICATIONS

European Search Report and Written Opinion issued in connection with related European Application No. 16193545.7 dated Feb. 15, 2017.

(Continued)

*Primary Examiner* — Jason D Shanske
*Assistant Examiner* — Sang K Kim
(74) *Attorney, Agent, or Firm* — McGarry Bair PC

(57) ABSTRACT

An airfoil for a gas turbine engine comprises a cooling circuit defined within the airfoil providing a flow of cooling fluid within the airfoil. The cooling circuit exhausts the flow of cooling fluid out a slot opening comprising an airfoil element. The slot opening further defines an acceleration zone and a deceleration zone to meter the flow of cooling fluid within the airfoil.

20 Claims, 6 Drawing Sheets

(56) References Cited

U.S. PATENT DOCUMENTS

| | | | |
|---|---|---|---|
| 5,223,320 A | 6/1993 | Richardson | |
| 5,356,265 A | 10/1994 | Kercher | |
| 5,392,515 A | 2/1995 | Auxier et al. | |
| 5,405,242 A | 4/1995 | Auxier et al. | |
| 5,660,524 A | 8/1997 | Lee et al. | |
| 5,660,525 A | 8/1997 | Lee et al. | |
| 5,690,472 A | 11/1997 | Lee | |
| 5,690,473 A | 11/1997 | Kercher | |
| 5,931,638 A | 8/1999 | Krause et al. | |
| 6,164,912 A | 12/2000 | Tabbita et al. | |
| 6,234,755 B1 | 5/2001 | Bunker et al. | |
| 6,257,831 B1 | 7/2001 | Papple et al. | |
| 6,832,889 B1 | 12/2004 | Lee et al. | |
| 6,955,522 B2 | 10/2005 | Cunha et al. | |
| 6,969,230 B2 | 11/2005 | Shi et al. | |
| 6,974,308 B2 | 12/2005 | Halfmann et al. | |
| 7,011,502 B2 | 3/2006 | Lee et al. | |
| 7,296,973 B2 | 11/2007 | Lee et al. | |
| 7,300,250 B2 | 11/2007 | Papple | |
| 7,690,893 B2 | 4/2010 | Cunha | |
| 7,841,828 B2 | 11/2010 | Liang | |
| 7,901,183 B1 | 3/2011 | Liang | |
| 7,980,819 B2 | 7/2011 | Albert et al. | |
| 8,057,182 B2 | 11/2011 | Brittingham et al. | |
| 8,092,175 B2 | 1/2012 | Beeck et al. | |
| 8,118,553 B2 * | 2/2012 | Liang | F01D 5/187 415/115 |
| 8,177,506 B2 | 5/2012 | Cunha et al. | |
| 8,292,582 B1 | 10/2012 | Liang | |
| 8,628,298 B1 | 1/2014 | Liang | |
| 8,764,394 B2 | 7/2014 | Lee et al. | |
| 2004/0076519 A1 * | 4/2004 | Halfmann | B22C 9/04 416/97 R |
| 2005/0111977 A1 | 5/2005 | Lee et al. | |
| 2005/0169752 A1 | 8/2005 | Lee et al. | |
| 2006/0034690 A1 | 2/2006 | Papple | |
| 2006/0093480 A1 | 5/2006 | Cunha et al. | |
| 2007/0071601 A1 | 3/2007 | Papple | |
| 2008/0056908 A1 | 3/2008 | Morris et al. | |
| 2008/0085193 A1 * | 4/2008 | Liang | F01D 5/187 416/97 R |
| 2014/0031275 A1 | 1/2014 | Lewis et al. | |
| 2014/0033736 A1 | 2/2014 | Propheter-Hinckley et al. | |
| 2014/0147287 A1 * | 5/2014 | Xu | F01D 5/186 416/96 R |
| 2014/0286790 A1 * | 9/2014 | Molter | F01D 5/187 416/97 R |
| 2017/0107824 A1 | 4/2017 | Krumanaker et al. | |
| 2017/0107826 A1 | 4/2017 | Krumanaker et al. | |
| 2017/0107829 A1 | 4/2017 | Krumanaker et al. | |
| 2018/0283183 A1 * | 10/2018 | Gallier | F01D 5/187 |

FOREIGN PATENT DOCUMENTS

| | | |
|---|---|---|
| EP | 3124746 A1 | 2/2017 |
| JP | 2003-278503 A | 10/2003 |
| WO | 2014031275 A1 | 2/2014 |
| WO | 2014055259 A1 | 4/2014 |
| WO | 2015123006 A1 | 8/2015 |

OTHER PUBLICATIONS

European Search Report and Written Opinion issued in connection with related European Application No. 16193546.5 dated Feb. 15, 2017.

European Search Report and Written Opinion issued in connection with corresponding European Application No. 16193559.8 dated Mar. 1, 2017.

European Search Report and Opinion issued in connection with corresponding EP Application No. 16191836.2 dated Feb. 22, 2017.

Notification of Reasons for Refusal issued in connection with corresponding JP Application No. 2016-198601 dated Sep. 5, 2017.

\* cited by examiner

TURBINE BLADE

BACKGROUND OF THE INVENTION

Turbine engines, and particularly gas or combustion turbine engines, are rotary engines that extract energy from a flow of combusted gases passing through the engine onto a multitude of rotating turbine blades. Gas turbine engines have been used for land and nautical locomotion and power generation, but are most commonly used for aeronautical applications such as for aircraft, including helicopters. In aircraft, gas turbine engines are used for propulsion of the aircraft. In terrestrial applications, turbine engines are often used for power generation.

Gas turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

An airfoil for a gas turbine engine having. The airfoil having an outer surface defining a pressure side and a suction side extending axially between a leading edge and a trailing edge and extending radially between a root and a tip, and the trailing edge having a slot opening. The airfoil further comprises a cooling circuit located within the airfoil and comprises a cooling passage fluidly coupled to the cooling air inlet passage and extends from the root toward the tip and terminating in an aft turn fluidly coupled to the slot opening. The airfoil further comprises an airfoil element located within the cooling passage downstream of the turn and upstream of the slot opening and forming an acceleration zone in the passage along an upstream portion of the airfoil element and forming a deceleration zone in the passage along a downstream portion of the airfoil element.

A gas turbine engine having a turbine rotor disk. The blade comprises a dovetail having at least one cooling air inlet passage and configured to mount to the turbine rotor disk and an airfoil extending radially from the dovetail and having an outer surface defining a pressure side and a suction side extending axially between a leading edge and a trailing edge, and extending radially between a root and a tip, with the root being adjacent the dovetail and the trailing edge having a slot opening. The blade comprises a cooling circuit located within the airfoil and comprising a cooling passage fluidly coupled to the cooling air inlet passage and having multiple passes extending relatively between the root and the tip, with the multiple passes in a fore-to-aft serpentine arrangement. The aft-most one of the multiple passes terminates in an aft turn fluidly coupled to the slot opening and the cooling passage having an exit nozzle formed by a converging portion defining an acceleration zone and a diverging portion defining a deceleration zone, which are separated by a minimum cross-section area to define a choke, with the diverging portion located adjacent the slot opening. The blade comprises an airfoil element located within the nozzle and extending between the pressure side and the suction side.

A blade for a gas turbine engine comprising a pressure side and a suction side, extending chord-wise between a leading edge and a trailing edge and extending span-wise between a root and a tip. A trailing edge cooling circuit is located within the airfoil near the trailing edge, terminating in an aft turn and fluidly coupled to a trailing edge slot opening. An airfoil element is located within the cooling circuit downstream of the turn and upstream of the slot opening, forming an acceleration zone in the cooling circuit along an upstream portion of the airfoil element, and a deceleration zone in the cooling circuit along a downstream portion of the airfoil element.

DESCRIPTION OF EMBODIMENTS OF THE INVENTION

The described embodiments of the present invention are directed to a turbine blade, and in particular to cooling a turbine blade. For purposes of illustration, the present invention will be described with respect to a turbine blade for an aircraft gas turbine engine. It will be understood, however, that the invention is not so limited and can have general applicability in non-aircraft applications, such as other mobile applications and non-mobile industrial, commercial, and residential applications. It can also have application to airfoils, other than a blade, in a turbine engine, such as stationary vanes.

It should be appreciated that as described herein the term "span-wise" should be understood as the direction generally extending between a root and a tip of an airfoil. It should be further understood that as described herein, the term "chord-wise" should be understood as the direction generally extending arcuately between a leading edge and a trailing edge of an airfoil.

Figure 1:
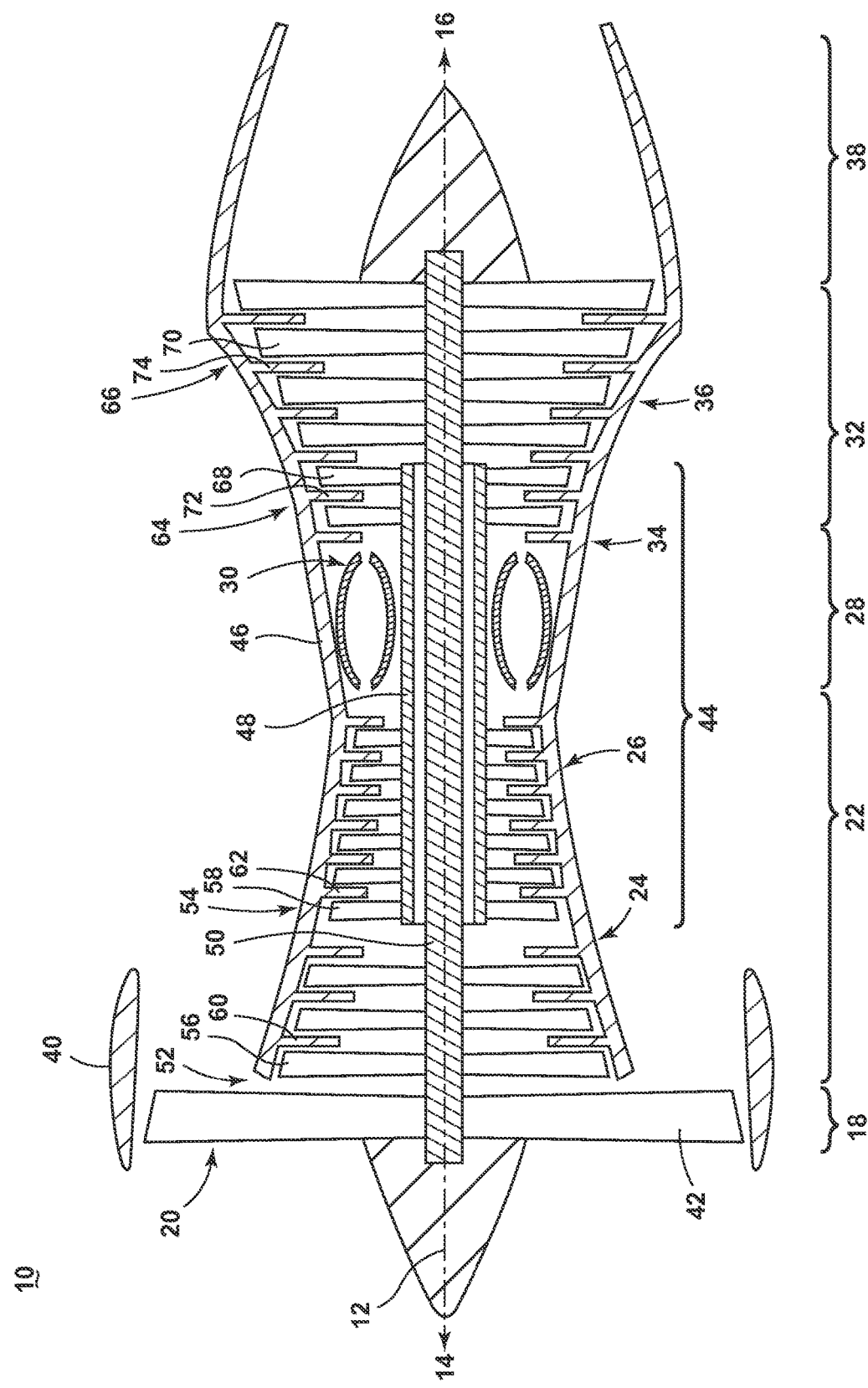
FIG. 1 is a schematic cross-sectional diagram of a gas turbine engine for an aircraft.

FIG. 1 is a schematic cross-sectional diagram of a gas turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of airfoils in the form of fan blades 42 disposed radially about the centerline 12. The HP compressor 26, the combustor 30, and the HP turbine 34 form a core 44 of the engine 10, which generates combustion gases. The core 44 is surrounded by core casing 46 which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20.

The LP compressor 24 and the HP compressor 26 respectively include a plurality of compressor stages 52, 54, in which a set of airfoils in the form of compressor blades 56, 58 rotate relative to a corresponding set of static airfoils in the form of compressor vanes 60, 62 (also called a nozzle) to compress or pressurize the stream of fluid passing through the stage. In a single compressor stage 52, 54, multiple compressor blades 56, 58 may be provided in a ring and may extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible.

The HP turbine 34 and the LP turbine 36 respectively include a plurality of turbine stages 64, 66, in which a set of airfoils in the form of turbine blades 68, 70 are rotated relative to a corresponding set of static airfoils in the form of turbine vanes 72, 74 (also called a nozzle) to extract energy from the stream of fluid passing through the stage. In a single turbine stage 64, 66, multiple turbine blades 68, 70 may be provided in a ring and may extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the ambient air supplied by the fan 20 may bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid may be, but is not limited to, fluid discharged from the LP compressor 24 or the HP compressor 26.

Figure 2:
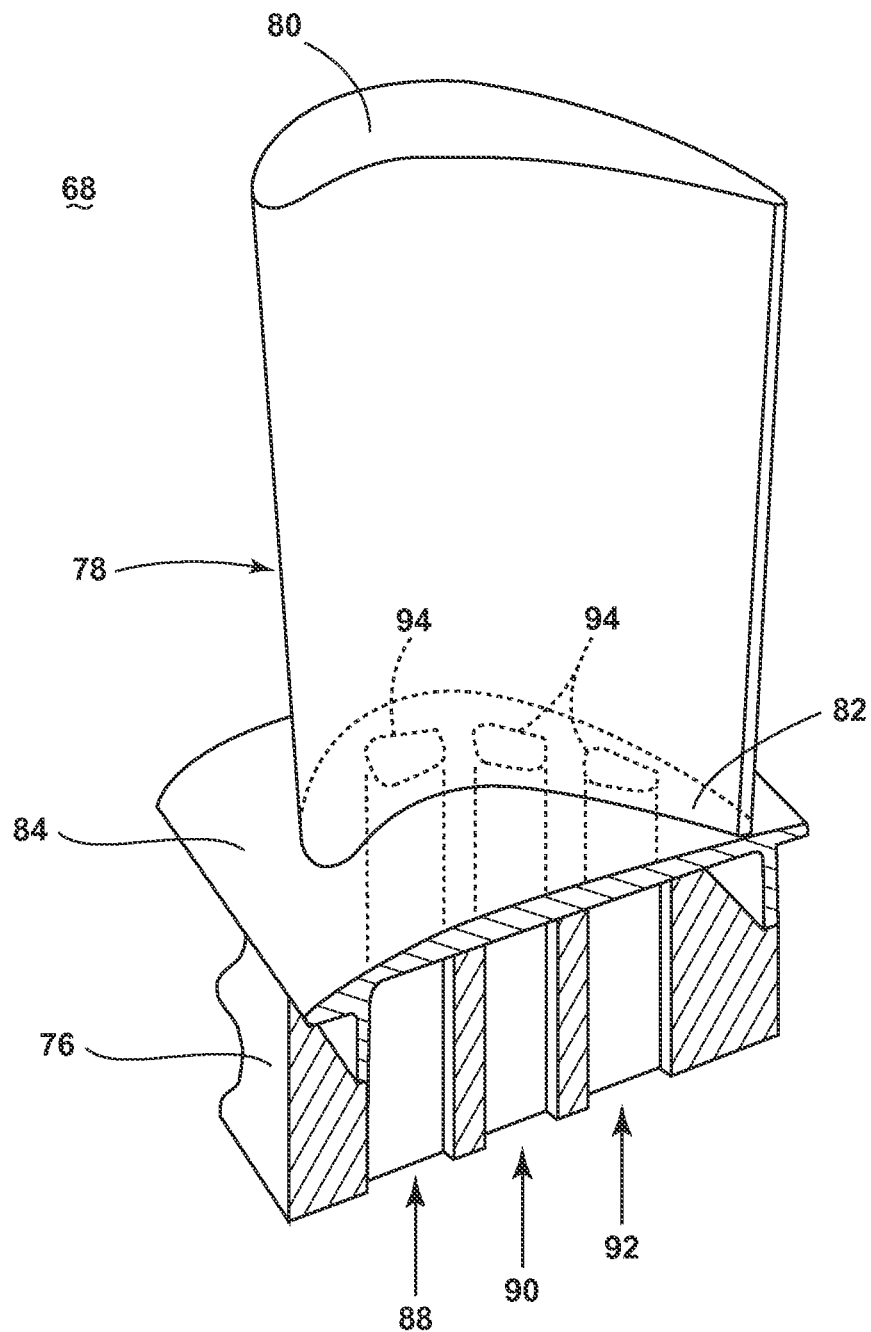
FIG. 2 is a perspective view of an engine component in the form of a turbine blade of the engine of FIG. 1 with cooling air inlet passages.

FIG. 2 is a perspective view of an engine component in the form of one of the turbine blades 68 of the engine 10 from FIG. 1. The turbine blade 68 includes a dovetail 76 and an airfoil 78. The airfoil 78 comprises a root 82 adjacent the dovetail 76 and a tip 80 opposite of the root 82. The dovetail 76 further includes a platform 84 integral with the airfoil 78 at the root 82, which helps to radially contain the turbine air flow. The dovetail 76 can be configured to mount to a turbine rotor disk on the engine 10. The dovetail 76 comprises at least one inlet passage, exemplarily shown as a first inlet passage 88, a second inlet passage 90, and a third inlet passage 92, each extending through the dovetail 76 to provide internal fluid communication with the airfoil 78 at a passage outlet 94. It should be appreciated that the dovetail 76 is shown in cross-section, such that the inlet passages 88, 90, 92 are housed within the body of the dovetail 76.

Figure 3:
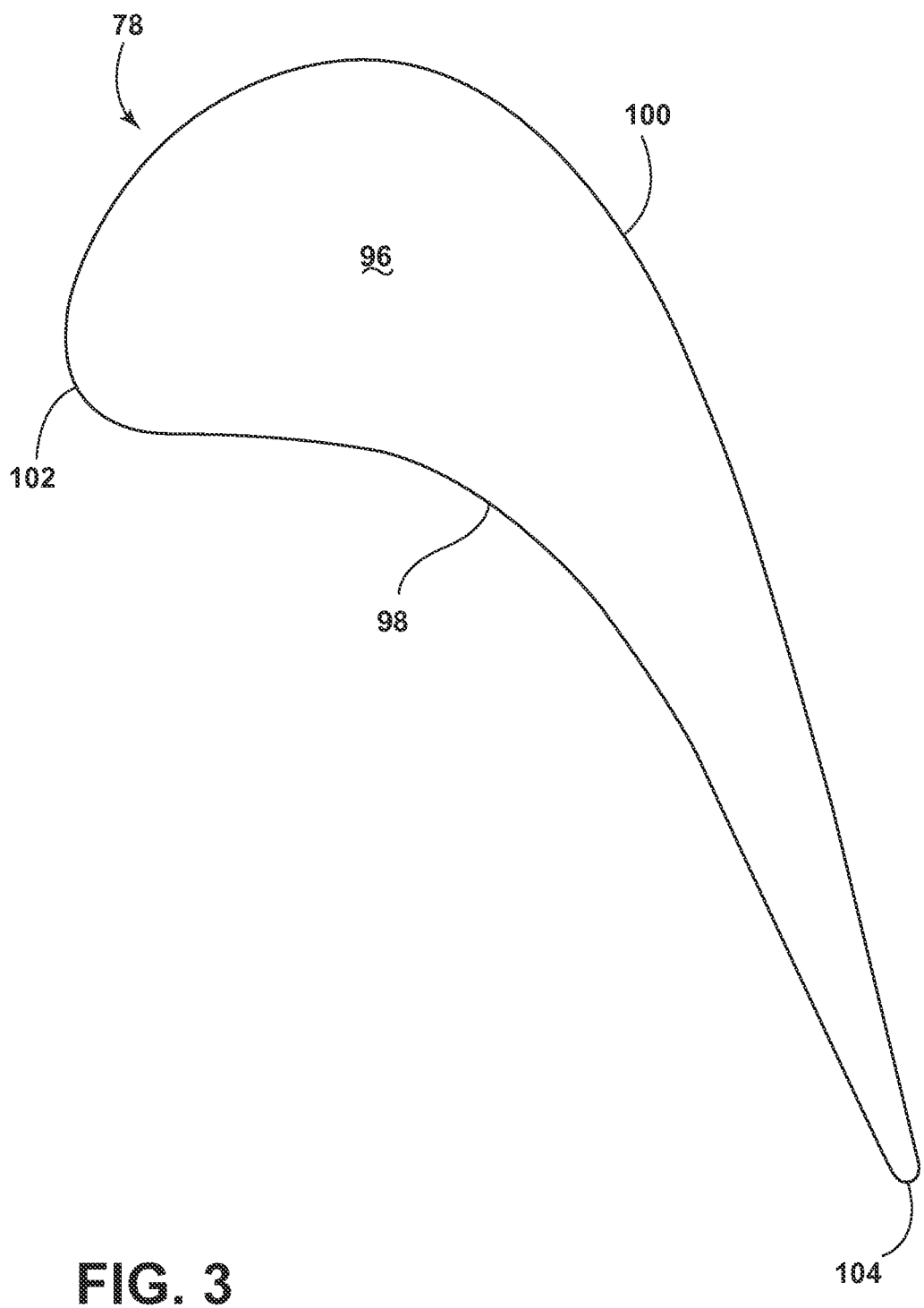
FIG. 3 is a cross-sectional view of the airfoil of FIG. 2.

Turning to FIG. 3, the airfoil 78, shown in cross-section, has a concave-shaped pressure sidewall 98 and a convex-shaped suction sidewall 100 which are joined together to define an airfoil shape with a leading edge 102 and a trailing edge 104. The blade 68 rotates in a direction such that the pressure sidewall 98 follows the suction sidewall 100. Thus, as shown in FIG. 3, the airfoil 78 would rotate upward toward the top of the page.

Figure 4:
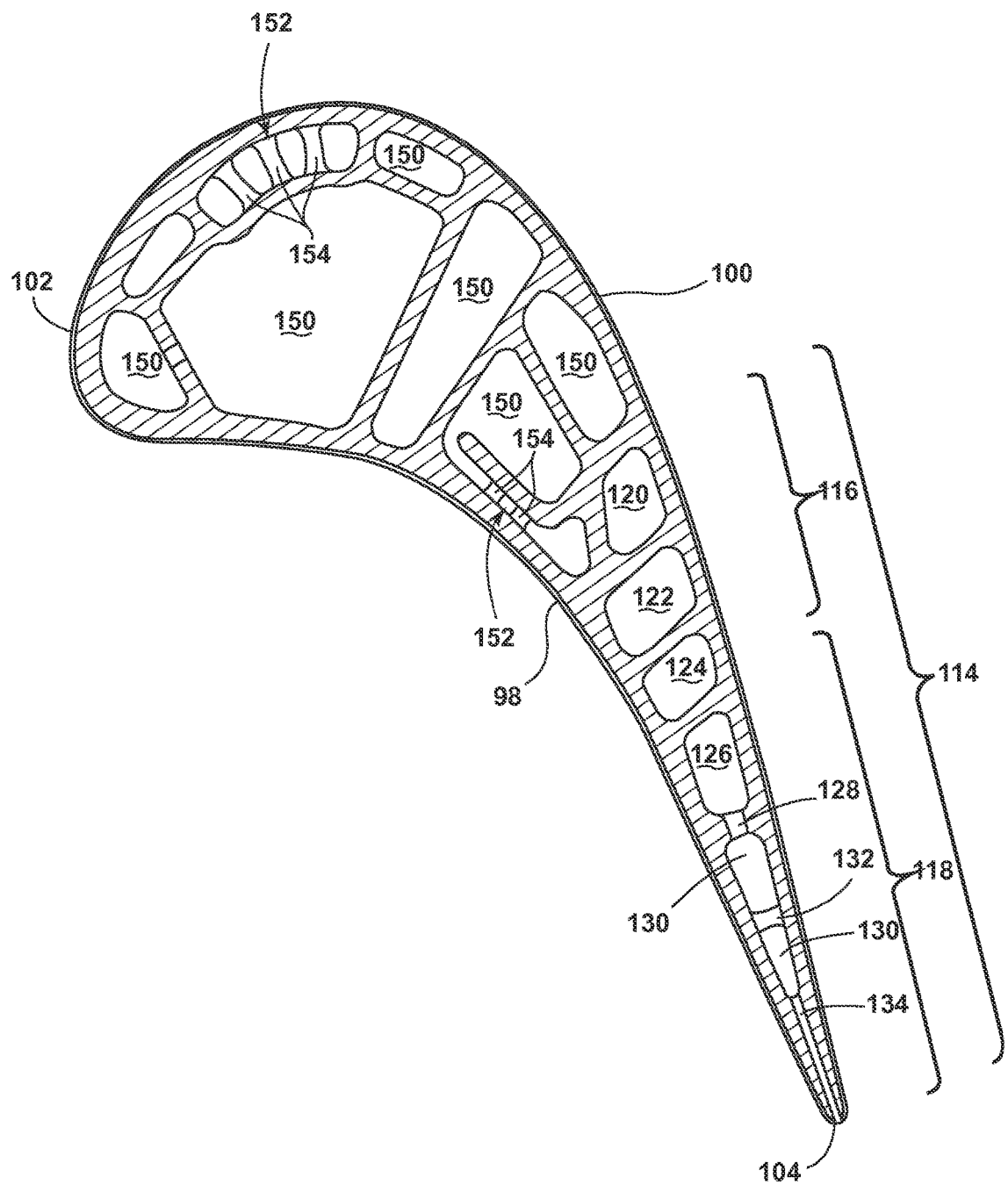
FIG. 4 is a diagram of the cross-sectional airfoil of FIG. 3 illustrating a plurality of interior passages defining a trailing edge cooling circuit.

The airfoil 78 comprises a plurality of internal passages which can be arranged to form one or more cooling circuits dedicated to cool a particular portion of the blade 68. The passages and the corresponding cooling circuits are illustrated in FIG. 4, which is a cross-sectional chord-wise view of the airfoil 78. It should be appreciated that the respective geometries of each individual passage within the airfoil 78 as shown is exemplary, each illustrating one or more elements of passages forming cooling circuits and should not limit the airfoil 78 to the geometries, dimensions, or positions as shown.

The cooling circuits can be defined by one or more passages extending radially within the airfoil 78. It should be appreciated that the passages can comprise one or more film holes which can provide fluid communication between the particular passage and the external surface of the airfoil 78, providing a film of cooling fluid along the external surface of the airfoil 78.

A cooling circuit comprising a trailing edge cooling circuit 114 can be disposed adjacent to the trailing edge 104 of the airfoil 78. The trailing edge cooling circuit 114 can comprise a first cooling circuit 116 and a second cooling circuit 118 being commonly fed with a flow of cooling fluid from an inlet in the dovetail 76, such as the third inlet passage 92. The first cooling circuit 116 is disposed forward of the second cooling circuit 118 in a chord-wise direction relative to the direction of the airflow within the engine 10.

The first cooling circuit 116, comprising three passes as fluidly coupled passages, comprises a fore-most supply passage 120 in fluid communication with the inlet passage 92. The supply passage 120 is adjacent to and in fluid communication with a central passage 122. The central passage 122 is in fluid communication with aft-most an exhaust passage 124, adjacent to the central passage 122 and opposite of the supply passage 120. The exhaust passage 124 can comprise one or more film holes to provide a flow of cooling fluid to the external surface of the airfoil 78 such as the external surface of the pressure sidewall 98.

The second cooling circuit 118 comprises a supply passage 126, adjacent to the exhaust passage 124 of the first cooling circuit 116. The supply passage 126 is in fluid communication with a trailing edge passage 130 adjacent to the supply passage 126 through a plurality of openings 128. A plurality of film holes can extend from the external surface of the airfoil 78 to the internal passages to provide a film of cooling fluid to the external surface of the airfoil 78. Additionally, the trailing edge passage 130 can comprise a plurality of pins, which collectively form a pin bank 132 (FIG. 5), disposed along the span-wise length of the trailing edge passage 130. The trailing edge passage 130 can fluidly couple to the external surface of the airfoil 78 at the trailing edge 104 through a plurality of slots 134.

Furthermore, the remaining interior 96 of the airfoil 78 can comprise one or more of cooling passages 150, pins or pin banks 152, near wall cooling or mesh passages 154, and film holes which can comprise one or more additional cooling circuits within the airfoil 78. The layout, geometry, and orientation of the additional cooling circuits is exemplary and should not be understood as limiting.

Figure 5:
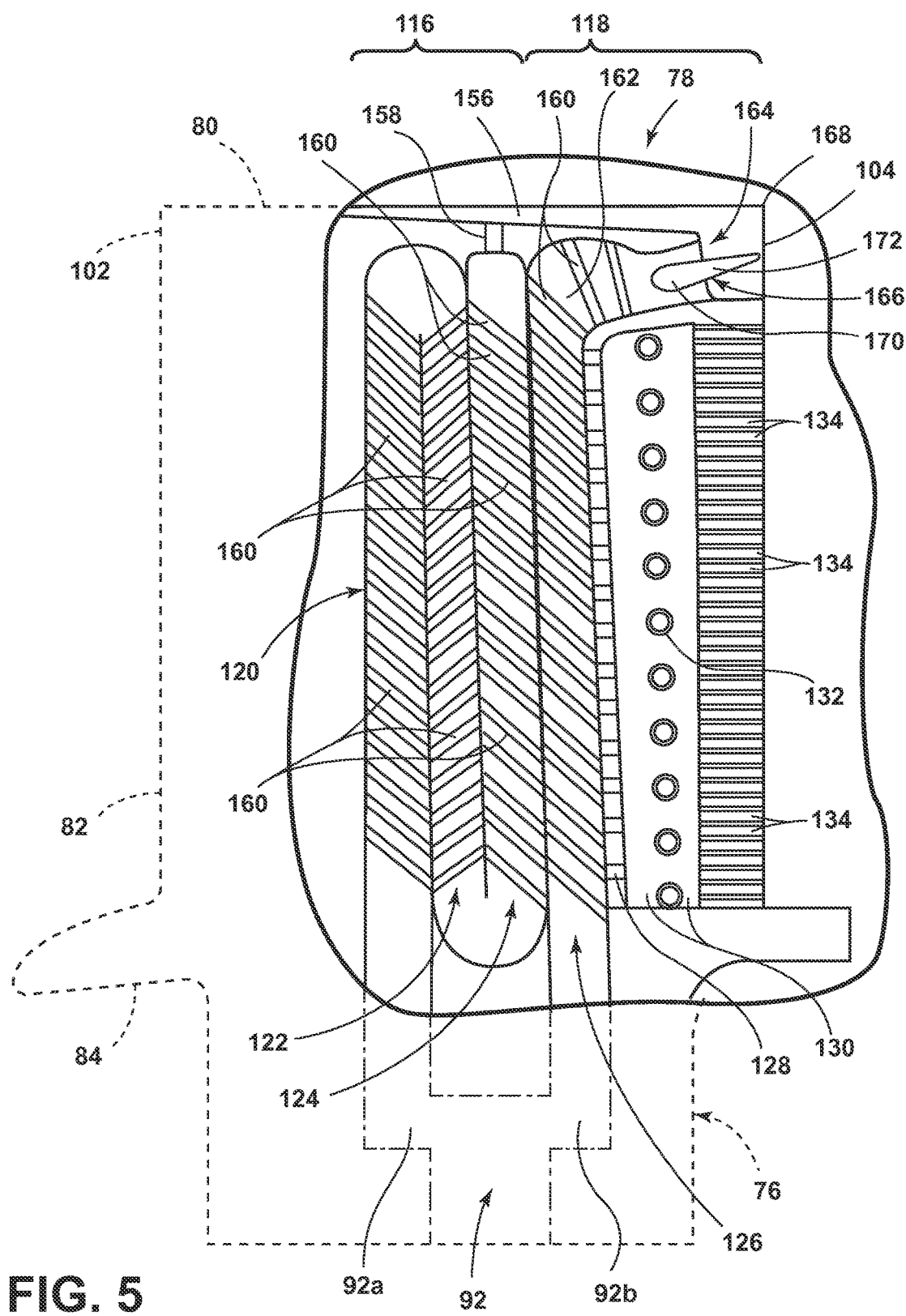
FIG. 5 is a span-wise cross-sectional view of the airfoil of FIG. 3.

Turning now to FIG. 5, a span-wise cross-sectional view of the airfoil best illustrates the orientation of the trailing edge cooling circuit 114. The third inlet passage 92 disposed within the dovetail 76 can further divide into a forward inlet passage 92a and an aft inlet passage 92b, providing cooling fluid to the first cooling circuit 116 and the second cooling circuit 118, respectively. The passages within the first cooling circuit 116, can further comprise a plurality of turbulators 160, which increase the turbulence within the passages. The forward inlet passage 92a provides a cooling fluid to the supply passage 120, moving in a root-to-tip direction. The supply passage 120 provides the cooling fluid to the central passage 122, moving in a tip-to-root direction. The central passage 122 provides the cooling fluid to the exhaust passage 124, moving in a root-to-tip direction. As such, the supply passage 120, central passage 122, and the exhaust passage 124 can define a substantially serpentine flow path. Cooling fluid within the exhaust passage 124 can be exhausted through a plurality of film holes (not shown) or can be provided to a tip cooling passage 156 through an outlet channel 158.

The second cooling circuit 118 can be fed from the aft inlet passage 92b, providing a cooling fluid to the supply passage 126. The supply passage 126 can further comprise a plurality of turbulators 160 to create a turbulent cooling fluid flow within the supply passage 126. The supply passage 126 further comprises an aft turn 162, turning the cooling flow path defined by the supply passage 126 from a tip 80 direction to a trailing edge 104 direction. The aft turn 162 can comprise one or more turbulators 160 disposed within it. Downstream of the aft turn 162, the supply passage 126 is in fluid communication with a slot opening 164. The slot opening 164 is adjacent to a flag tip 168 where the trailing edge 104 meets the tip 80. An airfoil element 166 is disposed within the supply passage 126 downstream of the aft turn 162 and upstream of the slot opening 164 and extends between the pressure sidewall 98 and the suction sidewall 100 of the airfoil 78. The airfoil element 166 can define a shape similar to the cross-section of an airfoil. As such, the airfoil element 166 can comprise an upstream portion 170 and a downstream portion 172 with respect to the flow path of a cooling fluid within the supply passage 126. The upstream portion 170 of the airfoil element 166 comprises a greater span-wise cross-sectional area relative to the downstream portion 172 of the airfoil element 166. While the shape of the airfoil element 166 is illustrated as substantially linear, being substantially symmetrical about a chord of the airfoil, it can further comprise an arcuate shape with a trailing end of the airfoil element 166 angled in a tip or root direction and can be asymmetrical with respect to the chord.

The supply passage 126, upstream of the aft turn 162, can provide a flow of cooling fluid to the trailing edge passage 130 through the plurality of openings 128 disposed therebetween. The trailing edge passage 130 further comprises multiple pins 132 illustrated as an exemplary pin bank. The trailing edge passage 130 exhausts the cooling fluid flow through the slots 134 disposed between the trailing edge passage 130 and the trailing edge 104. It should be appreciated that the number of openings 128, pins 132, and slots 134 is exemplary, illustrating a conceptual overview of the second cooling circuit 118 and should not be construed as limiting.

Figure 6:
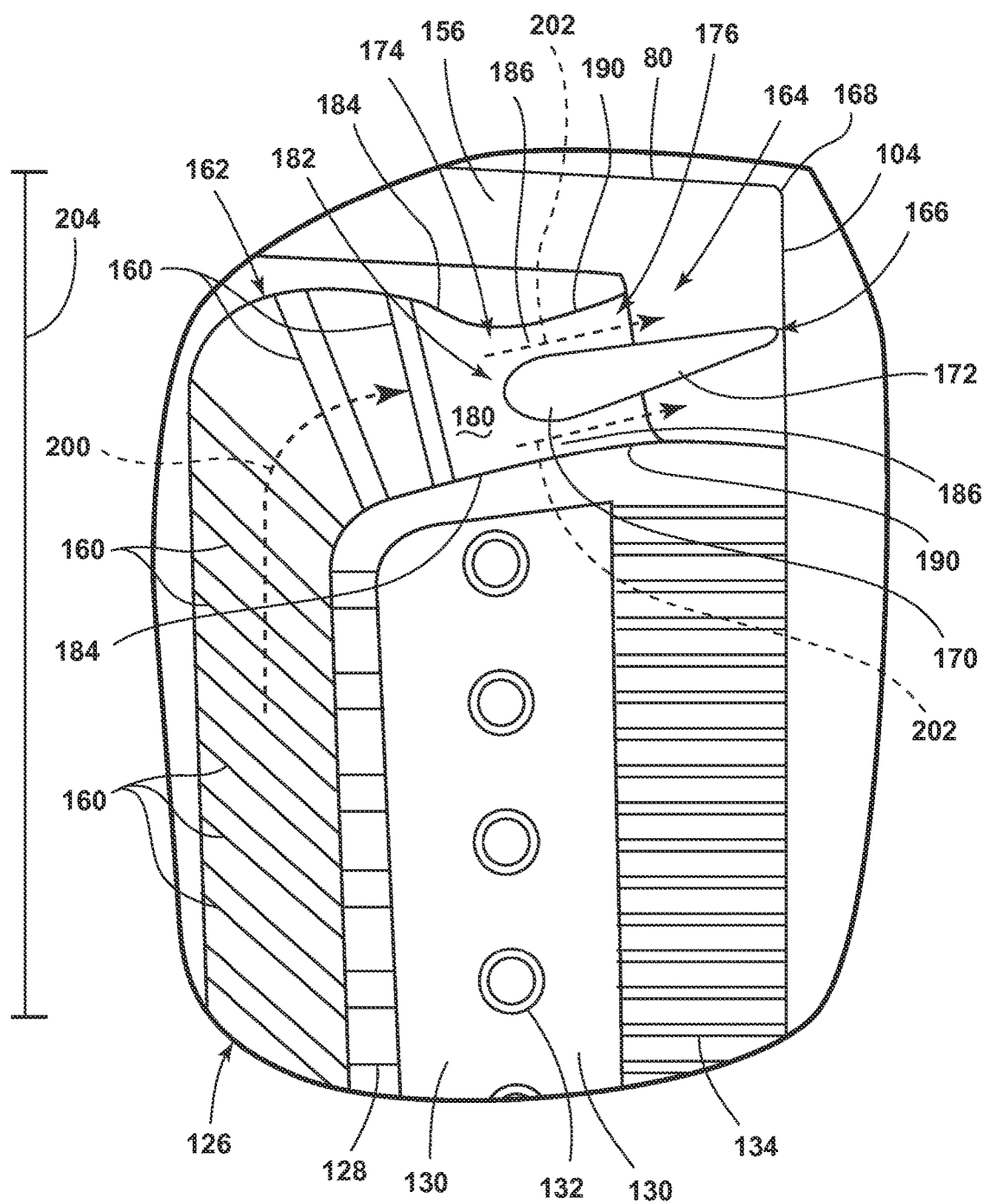
FIG. 6 is a close up view of FIG. 5 illustrating a span-wise cross-section of an exhaust passage of a trailing edge circuit of the airfoil of FIG. 4.

Turning to FIG. 6, a close-up view of the slot opening 164 and the airfoil element 166 best illustrates the elements comprising the exhaust section of the supply passage 126 of the second cooling circuit 118. The cross-sectional area as discussed regarding FIG. 6 will be defined as the cross-sectional distance of an element as illustrated in a span-wise direction 204. The supply passage 126 can further comprise an exhaust passage 180 disposed between the aft turn 162 and the slot opening 164 with the airfoil element 166 disposed therein. The exhaust passage 180 can comprise a geometry defining an acceleration zone 174 and a deceleration zone 176. An exit nozzle 182 can at least partially define the acceleration zone 174 within the exhaust passage 180 along the upstream portion 170 of the airfoil element 166. The exit nozzle 182 can be defined by a converging portion 184 of the exhaust passage 180, such that the cross-section of the exhaust passage 180 is decreasing in span-wise area. As the span-wise area of the exhaust passage 180 decreases as the exhaust passage moves in the trailing edge 104 direction, the exit nozzle 182 is disposed at the minimum span-wise cross-sectional area to define a choke 186. The exhaust passage 180 can further comprise the airfoil element 166 disposed in a manner orienting the maximum span-wise cross-sectional area of the airfoil element 166 within the choke 186. As can be appreciated, the acceleration zone 174 can be defined combination of the converging portion 184 of the exhaust passage 180, the choke 186, and the airfoil element 166 disposed within the choke 186.

The deceleration zone 176 is defined downstream of the acceleration zone 174 and at least partially by the downstream portion 172 of the airfoil element 166. Downstream of the choke 186, the exhaust passage 180 further comprises a diverging portion 190, comprising an increasing cross-sectional area of the exhaust passage 180. The diverging portion 190 of the deceleration zone 176 can further be defined by the decreasing cross-sectional area of the downstream portion 172 of the airfoil element 166, such that the combination of the diverging portion 190 and the downstream portion 172 of the airfoil element 166 defines an increased cross-sectional area of the exhaust passage 180.

A flow path is illustrated by a set of flow arrows 200, 202. At arrow 200, the flow of cooling fluid travels from within the supply passage 126. The cooling fluid flow, at the aft turn 162, moves from a tip 80 direction to a trailing edge 104 direction. The cooling fluid flow at arrows 202 enters the acceleration zone 174 at the converging portion 184 of the exhaust passage 180, comprising an increasing velocity to the upstream portion 170 of the airfoil element 166. Downstream of the airfoil element 166, the cooling fluid flow at arrows 202 enters the diverging portion 190 of the exhaust passage 180, comprising a decreased velocity in the deceleration zone 176 when being exhausted from the airfoil 78 at the slot opening 164.

As can be appreciated, the acceleration zone 174 and deceleration zone 176 comprises two airflow metering sections, controlling the velocity of the cooling fluid flow as well as maintaining effective pressures through the trailing edge cooling circuit 114.

As is further appreciated, the particular geometry of the acceleration zone 174, deceleration zone 176, and the airfoil element 166 is exemplary and can vary from the particular dimensions as illustrated. Additionally, the position of the airfoil element 166 relative to the acceleration zone 174 and deceleration zone 176, as defined by the exhaust passage 180 is exemplary, such that the upstream and downstream portions 170, 172 of the airfoil element 166 can move in an upstream or downstream direction relative to the converging portion 184, choke 186, or the diverging portion 190.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a gas turbine engine, the airfoil comprising:
    an outer surface defining a pressure side and a suction side extending axially between a leading edge and a trailing edge and extending radially between a root and a tip defining a span-wise direction, and the trailing edge having a slot opening;
    a cooling circuit located within the airfoil and comprising:
        a cooling passage extending from the root toward the tip and terminating in an aft turn fluidly coupled to the slot opening via an exhaust passage defined between a radially outer wall terminating prior to the trailing edge and a radially inner wall extending to the trailing edge to at least partially define the slot opening;
        a trailing edge passage including a pin bank and fluidly coupled to the cooling passage via a set of openings provided between the cooling passage and the trailing edge passage;
        a plurality of slots fluidly coupling the trailing edge passage to the trailing edge; and
        an airfoil element located within the cooling passage downstream of the aft turn and the airfoil element provided upstream of the slot opening and forming an acceleration zone in the cooling passage along an upstream portion of the airfoil element and a deceleration zone in the cooling passage along a downstream portion of the airfoil element, with the airfoil element angled in the span-wise direction.

2. The airfoil according to claim 1 wherein the airfoil element has an increasing cross-sectional area, which in combination with a first surrounding portion of the cooling passage forms a reducing cross-sectional area of the cooling passage to define the acceleration zone, and a decreasing cross-sectional area, which in combination with a second surrounding portion of the cooling passage forms an increasing cross-sectional area of the cooling passage to define the deceleration zone.

3. The airfoil according to claim 2 wherein a third portion of the cooling passage immediately upstream of the airfoil element has a decreasing cross-sectional area to further define the acceleration zone.

4. The airfoil according to claim 3 wherein the third portion of the cooling passage overlaps in a flow direction with the increasing cross-sectional area of the airfoil element.

5. The airfoil according to claim 2 wherein a fourth portion of the cooling passage immediately around the airfoil element has an increasing cross-sectional area to further define the deceleration zone.

6. The airfoil according to claim 5 wherein the fourth portion of the cooling passage overlaps in a flow direction with the decreasing cross-sectional area of the airfoil element.

7. The airfoil according to claim 1 wherein the slot opening further extends along a portion of the tip.

8. The airfoil according to claim 1 further comprising turbulators located within the cooling passage.

9. The airfoil according to claim 8 wherein the turbulators are located through the aft turn.

10. The airfoil according to claim 1 wherein the airfoil element extends between the pressure side and the suction side.

11. A blade for a gas turbine engine having a turbine rotor disk, the blade comprising:
    a dovetail having at least one cooling air inlet passage and configured to mount to the turbine rotor disk;
    an airfoil extending radially from the dovetail and having an outer surface defining a pressure side and a suction side extending axially between a leading edge and a trailing edge and extending radially between a root and a tip, with the root being adjacent the dovetail, and the trailing edge having a slot opening;
    a cooling circuit located within the airfoil and comprising a cooling passage fluidly coupled to the cooling air inlet passage and fluidly coupled to an exhaust passage defined between a radially outer wall terminating prior to the trailing edge and a radially inner wall extending to the trailing edge to at least partially define the slot opening, the cooling circuit further including a trailing edge passage including a pin bank and fluidly coupled to the cooling passage via a set of openings, a plurality of slots fluidly coupling the trailing edge passage to the trailing edge, and the cooling passage having an exit nozzle formed by a converging portion defining an acceleration zone and a diverging portion defining a deceleration zone, which are separated by a minimum cross-section area to define a choke, with the diverging portion located adjacent the slot opening; and
    an airfoil element located within the exit nozzle and extending between the pressure side and suction side with the airfoil element angled in a span-wise direction relative to a chord-wise plane defined by the airfoil.

12. The blade according to claim 11 wherein the cooling circuit further includes three passes, with the fore-most and aft-most passes extending in a root-to-tip direction and the other pass extending in a tip-to-root direction.

13. The blade according to claim 11 further comprising turbulators located within at least the cooling passage.

14. The blade according to claim 13 wherein the turbulators are located through the exit nozzle.

15. The blade according to claim 12 wherein turbulators are located in all of the three passes.

16. The blade according to claim 14 wherein the slot opening further extends along a portion of the tip.

17. The blade according to claim 11 wherein the airfoil element has a maximum thickness and the airfoil element is located within the exit nozzle such that the maximum thickness is aligned with the choke.

18. The blade according to claim 11 wherein the slot opening further extends along a portion of the tip.

19. The blade according to claim 11 wherein the airfoil element extends in a chord-wise direction aft of the deceleration zone and through the slot opening.

20. A blade for a gas turbine engine comprising:
- an outer wall having a pressure side and a suction side extending chord-wise between a leading edge and a trailing edge and extending span-wise between a root and a tip; and
- a trailing edge cooling circuit located near the trailing edge and terminating in an aft turn fluidly coupled to a trailing edge slot opening via an exhaust passage defined between a radially outer wall terminating prior to the trailing edge and a radially inner wall extending to the trailing edge to at least partially define the trailing edge slot opening, the trailing edge cooling circuit including:
  - a trailing edge passage fluidly coupled to the trailing edge slot opening and,
  - an airfoil element located within the trailing edge cooling circuit downstream of the aft turn and upstream of the trailing edge slot opening, forming an acceleration zone in the cooling circuit along an upstream portion of the airfoil element and a deceleration zone in the cooling circuit along a downstream portion of the airfoil element, with the airfoil element angled in the span-wise direction.

* * * * *